(12) United States Patent
Hwang et al.

(10) Patent No.: US 10,821,915 B2
(45) Date of Patent: Nov. 3, 2020

(54) CLIP FOR VEHICLES

(71) Applicants: Hyundai Motor Company, Seoul (KR); Kia Motors Corporation, Seoul (KR)

(72) Inventors: Seung Hai Hwang, Hwaseong-Si (KR); Munaga Masthan Vikas, Nellore (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/510,732

(22) Filed: Jul. 12, 2019

(65) Prior Publication Data
US 2020/0254942 A1 Aug. 13, 2020

(30) Foreign Application Priority Data

Feb. 11, 2019 (IN) .............................. 201911005349

(51) Int. Cl.
| | |
|---|---|
| *B60R 13/02* | (2006.01) |
| *B60R 16/02* | (2006.01) |
| *F16B 2/20* | (2006.01) |
| *F16B 5/06* | (2006.01) |
| *H02G 3/36* | (2006.01) |
| *B60R 11/00* | (2006.01) |

(52) U.S. Cl.
CPC ...... *B60R 13/0206* (2013.01); *B60R 16/0215* (2013.01); *F16B 2/20* (2013.01); *F16B 5/065* (2013.01); *H02G 3/36* (2013.01); *B60R 2011/0003* (2013.01); *B60R 2011/0059* (2013.01)

(58) Field of Classification Search
CPC ... B60R 13/0206; B60R 16/0215; F16B 2/20; F16B 5/065; H02G 3/36
See application file for complete search history.

(56) References Cited

U.S. PATENT DOCUMENTS

| | | | | |
|---|---|---|---|---|
| 3,778,958 | A | * | 12/1973 | Fowler ................ B60R 13/0206 52/468 |
| 9,714,673 | B2 | * | 7/2017 | Phillips .................... F16B 12/24 |
| 2003/0102680 | A1 | * | 6/2003 | Sedlock .................. F16B 5/065 292/297 |
| 2004/0049895 | A1 | * | 3/2004 | Draggoo ............. B60R 13/0206 24/297 |
| 2004/0052575 | A1 | * | 3/2004 | Draggoo ............. B60R 13/0206 403/298 |
| 2017/0219126 | A1 | * | 8/2017 | Kato ......................... F16L 3/13 |
| 2017/0253195 | A1 | * | 9/2017 | Yamamoto ............. B60R 13/02 |
| 2017/0297506 | A1 | * | 10/2017 | Santillan Gutierrez ..................... F16B 5/065 |
| 2018/0058484 | A1 | * | 3/2018 | Marshman ............. F16B 5/065 |

(Continued)

FOREIGN PATENT DOCUMENTS

KR 10-2017-0106894 A 9/2017

*Primary Examiner* — Robert Sandy
*Assistant Examiner* — David M Upchurch
(74) *Attorney, Agent, or Firm* — Morgan, Lewis & Bockius LLP

(57) ABSTRACT

A clip for vehicles may include a clip body portion including a plurality of guide legs facing each other so that an opening between which an object is interposed is formed, a plurality of stud portions provided at an outside of the clip body portion as a shape of facing each other to fix the clip body portion to a panel, and a clip wing portion provided so that the object is mounted on the clip body portion.

16 Claims, 6 Drawing Sheets

(56) References Cited

U.S. PATENT DOCUMENTS

2018/0180076 A1\* 6/2018 Betancourt Santana ..................... B60R 13/00
2018/0209457 A1\* 7/2018 Snoeyink ................... B60J 5/04

\* cited by examiner

CLIP FOR VEHICLES

The present application claims priority to Indian Patent Application No. 201911005349, filed on Feb. 11, 2019, the entire contents of which is incorporated herein for all purposes by this reference.

BACKGROUND OF THE INVENTION

Field of the Invention

The present invention relates to a clip for vehicles. In particular, the present invention relates to a clip for vehicles for minimizing part number of derivative items generated from the vehicles.

Description of Related Art

Generally, many electrical components such as sensors, a curtain airbag, an inside handle bracket, wirings and a feeder cable etc. are disposed in the vehicle.

To form a layout of the electrical components, fixation and a securing space for mounting other components is possible by use of a T clip member.

For example, a feeder cable which is an electrical component is not sagged to a lower portion but contacts a vehicle body to a dead-end by the T clip member, therefore arrangement of the other electrical components is easy.

Like this, a plurality of T clip members is needed to fix the electrical components for manufacturing the vehicle. Accordingly, the T clip member is used by setting a part number for manufacturing the vehicle, and it is inevitable to dualize the part number because an engagement direction of the T clip member according to a kind of the vehicle is different.

For example, in an LHD vehicle, the engagement direction of the T clip member to a corresponding electrical component is left hand direction (upper part direction), whereas in an RHD vehicle, the engagement direction of the T clip member to a corresponding electrical component is right hand direction (lower part direction).

Accordingly, the T clip members have different part numbers according to a kind of the vehicle. Therefore, when the vehicle is manufactured by a line interflow, if there is no precise sequencing and separate marking work, the T clip members may be improperly mounted by high probability.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a clip for vehicles preventing dualization of part number due to asymmetry when a prior T clip is applied and being shared broadly.

A clip for vehicles according to an exemplary embodiment of the present invention may include a clip body portion including a plurality of guide legs facing each other so that an opening between which an object is interposed is formed, a plurality of stud portions provided at an outside of the clip body portion as a shape of facing each other to fix the clip body portion to a panel, and a clip wing portion provided so that the object is mounted on the clip body portion.

The stud portions may include a panel fixing body and a stud body being provided between the panel fixing body and the clip body portion and interposing the panel between the panel fixing body and the clip body portion with the clip body portion.

The stud body may be provided as an oval shape being convex toward the clip body portion.

The stud portions may be provided to be detachable from an upper side portion of the clip body portion.

The clip wing portion may be provided at an upper surface of the clip body portion as a plate shape extending in one direction thereof.

The clip body portion and the clip wing portion may be combined with each other to be 'T' shape.

The guide legs may be provided to extend from an upper end portion to a lower end portion of the clip body portion in one direction thereof.

The guide legs may be provided as a pair of facing each other symmetrically to form an opening.

Hooks protruding toward the opening may be provided at an end portion of the guide legs so that the object mounted on the opening is not broken away.

At least one mounting protrusion may be provided protrudingly at a center portion of the guide legs so that at least one object is mounted on the opening.

The guide legs may be provided as a pair of asymmetric shape, and one guide leg of the pair of guide legs may include a protruding portion which an object mounted between the guide legs is not broken away toward a lower portion.

A dividing member may be provided to extend in a longitudinal direction of the clip wing portion on an upper surface of the clip wing portion to position the object on both sides.

The object may be one of electrical components including a curtain airbag, a handle bracket and a wiring cable.

According to an exemplary embodiment of the present invention, the clip for vehicles prevents dualization of part number due to asymmetry when a prior T clip is applied and may be shared broadly.

Furthermore, cost reduction may be expected by mass production of the corresponding clip from now on.

Furthermore, sharing is possible according to public use of the clip when the clip is used to a curtain airbag or a power cable.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
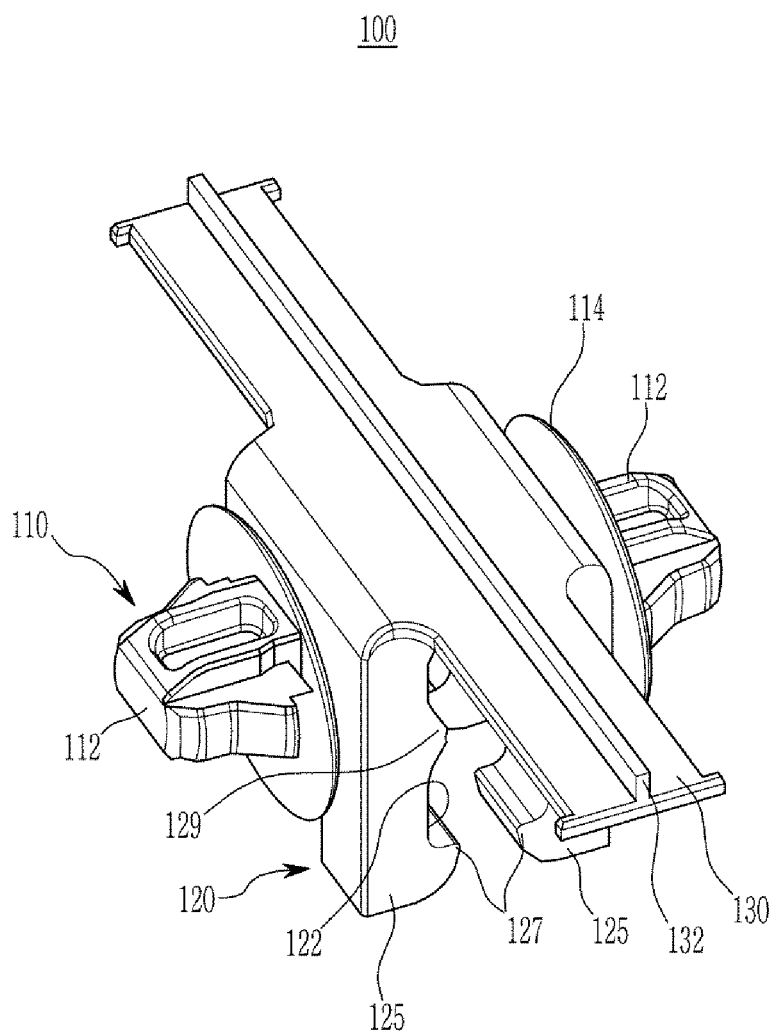
FIG. 1 is a schematic perspective view of a clip for vehicles according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Furthermore, with exemplary embodiments of the present invention, a detailed description is provided of the constituent elements in the various exemplary embodiments with reference to the relevant drawings by use of the same reference numerals for the same constituent elements, while only constituent elements that are different from those related to the various exemplary embodiments are described in other exemplary embodiments.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. Furthermore, same structures, elements, or components illustrated in two or more drawings use same reference numerals for showing similar features. It will be understood that when an element such as a layer, film, region, or substrate is referred to as being "on" another element, it may be directly on the other element or intervening elements may also be present.

The exemplary embodiment of the present invention shows an exemplary embodiment of the present invention in detail. As a result, various modifications of the drawings will be expected. Therefore, the exemplary embodiment of the present invention is not limited to a specific aspect of the illustrated region, and for example, includes modifications of an aspect by manufacturing.

Hereinafter, referring to FIG. 1 to FIG. 3, a clip for vehicles according to an exemplary embodiment of the present invention will be described.

Figure 2:
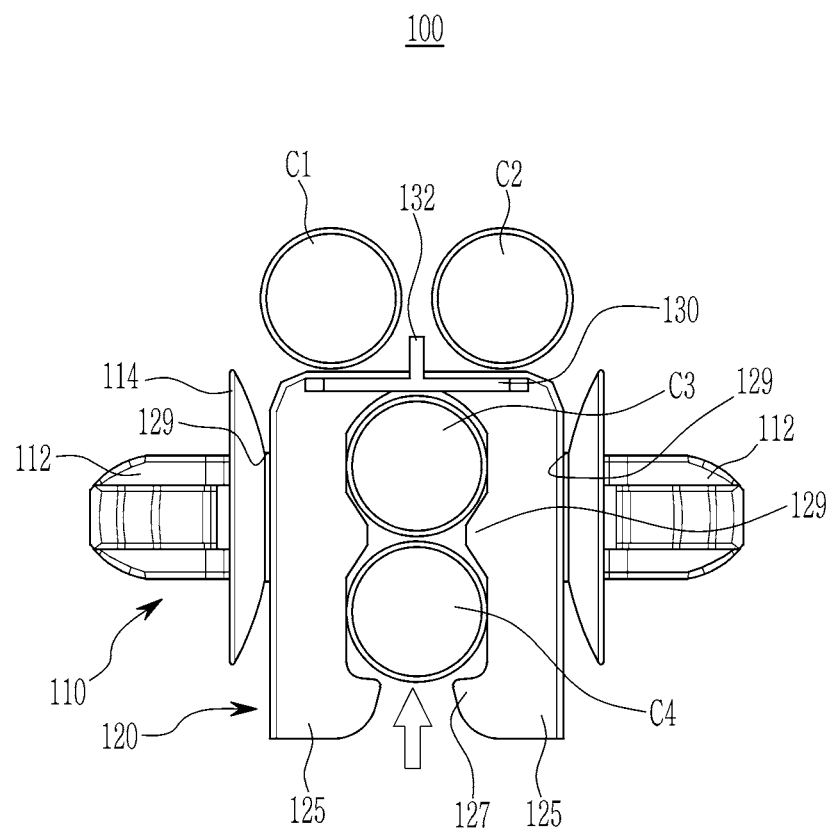
FIG. 2 is a schematic side view of a clip for vehicles according to an exemplary embodiment of the present invention.
Figure 3:
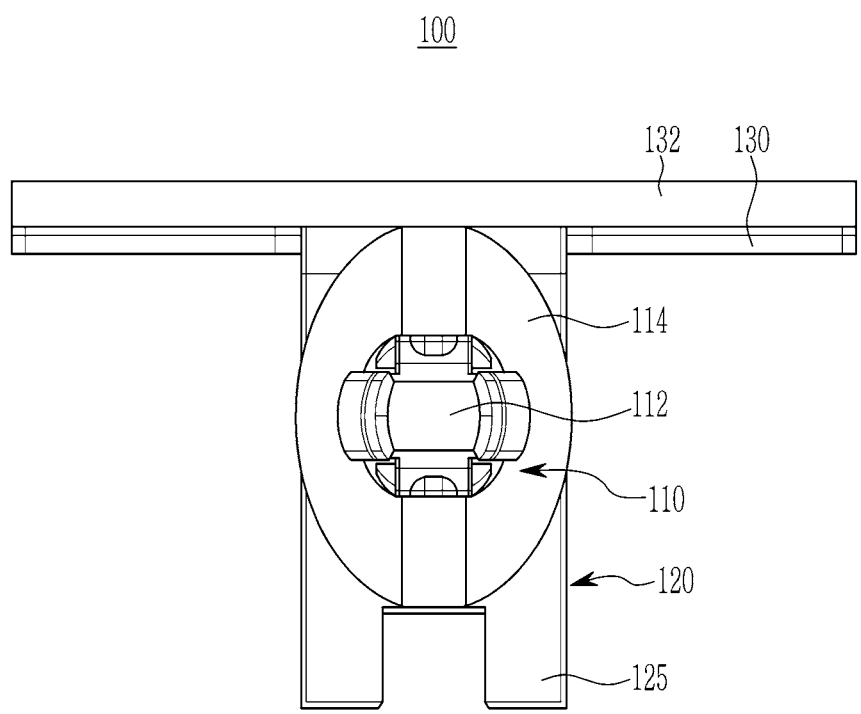
FIG. 3 is a schematic front view of a clip for vehicles according to an exemplary embodiment of the present invention.

FIG. 1 is a schematic perspective view of a clip for vehicles according to an exemplary embodiment of the present invention, FIG. 2 is a schematic side view of a clip for vehicles according to an exemplary embodiment of the present invention, and FIG. 3 is a schematic front view of a clip for vehicles according to an exemplary embodiment of the present invention.

As shown in FIG. 1, the clip for vehicles 100 according to an exemplary embodiment of the present invention includes a clip body portion 120, a plurality of stud portions 110, and a clip wing portion 130 connected to or monolithically formed with the clip body portion 120.

The clip body portion 120 includes a plurality of guide legs 125 facing each other, and an opening 122 is formed so that objects C3 and C4 are located between the guide legs 125.

The guide legs 125 are provided to extend from an upper end portion to a lower end portion of the clip body portion 120 in one direction thereof, and the guide legs 125 are provided as a pair of facing each other symmetrically to form an opening 122.

Hooks 127 protruding toward the opening 122 are provided at an end portion of the guide legs 125 so that the objects C3 and C4 mounted on the opening 122 is not broken away.

Furthermore, at least one mounting protrusion 129 may be provided protrudingly at a center portion of at least one of the guide legs 125 so that at least one object is mounted on the opening 122. On the basis of the mounting protrusion 129, openings 122 may be formed at an upper side and lower side one by one, and a plurality of mounting protrusions 129 is formed to have a plurality of openings 122 at an upper side and lower side thereof.

The stud portion 110 may be provided as a shape of facing each other in plural. Two stud portions 110 may be disposed at an outside of the clip body portion 120 one by one. The stud portions 110 may fix the clip body portion 120 to a panel of a vehicle. The panel of the vehicle is only an example, but it is limited to this, it may be other structure.

The stud portions 110 include a panel fixing body 112 and a stud body 114. The panel fixing body 112 fixes the clip body portion 120 to the panel of the vehicle. The stud body 114 is provided between the panel fixing body 112 and the clip body portion 120. The panel is located between the clip body portion 120 and the stud body 114, and the clip body portion 120 is fixed to the panel by the panel fixing body 112 and the stud body 114.

The stud body 114 may be provided as an oval shape being convex toward the clip body portion 120. By the present shape, the panel may be easily located between the stud body 114 and the clip body portion 120. Furthermore, the stud body 114 make the clip body portion 120 easily contact the panel of the vehicle to secure contact force between the stud body 114 and the panel of the vehicle although the panel has a different thickness according to kinds of vehicles.

Furthermore, the stud body 114 and the panel fixing body 112 may be provided to be detachable coupled to a coupling hole 129 formed on an upper side portion of the clip body portion 120.

The clip wing portion 130 is mounted on the clip body portion 120, and the objects C1 and C2 are mounted on an upper surface of the clip wing portion 130. Separately from which the objects C3 and C4 mounted on an opening 122 formed at the clip body portion 120, other objects C1 and C2 may be mounted on the upper surface of the clip wing portion 130 on the clip body portion 120.

The clip wing portion 130 may be provided at an upper surface of the clip body portion 120 as a plate shape extending in one direction thereof. The objects C1 and C2 may be disposed along the direction in which the clip wing portion 130 extends.

The clip body portion 120 and the clip wing portion 130 may be combined with each other to be 'T' shape. Furthermore, a dividing member 132 may be mounted on an upper surface of the clip wing portion 130. The dividing member 130 is provided to extend in a longitudinal direction of the clip wing portion 130, and the objects C1 and C2 may be positioned on both sides of the dividing member 132.

As shown in FIG. 1 to FIG. 3, one or two objects may be disposed on the opening 122 formed at the clip body portion 120, and two objects may be disposed on both the sides of the dividing member 132 on the clip wing portion 130, the objects may be engaged to the clip 100 for vehicles in three or four directions.

The objects C1, C2, C3 and C4 may be one of electrical components including a curtain airbag, a handle bracket and a wiring cable.

Figure 4:
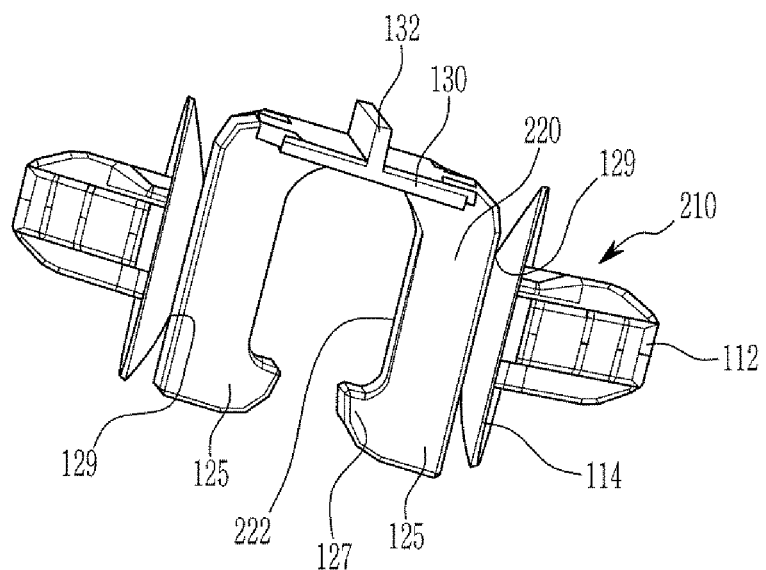
FIG. 4 is a schematic side view of a clip for vehicles according to the other exemplary embodiment of the present invention.

FIG. 4 is a schematic side view of a clip for vehicles according to the other exemplary embodiment of the present invention.

Referring to FIG. 4, a clip for vehicles 200 includes a clip body portion 220 including a plurality of guide legs 125 which are provided as a pair of facing each other symmetrically to form an opening 222 on which objects are mounted, two stud portions 210 are provided as a shape of facing each other at an outside of the clip body portion 220, and a clip wing portion 130 is mounted on the clip body portion 220.

Hooks 127 protruding toward the opening 222 are provided at an end portion of the guide legs 125, and one opening 222 may be formed at the clip body portion 220 so that one object is mounted between two guide legs 125.

Figure 5:
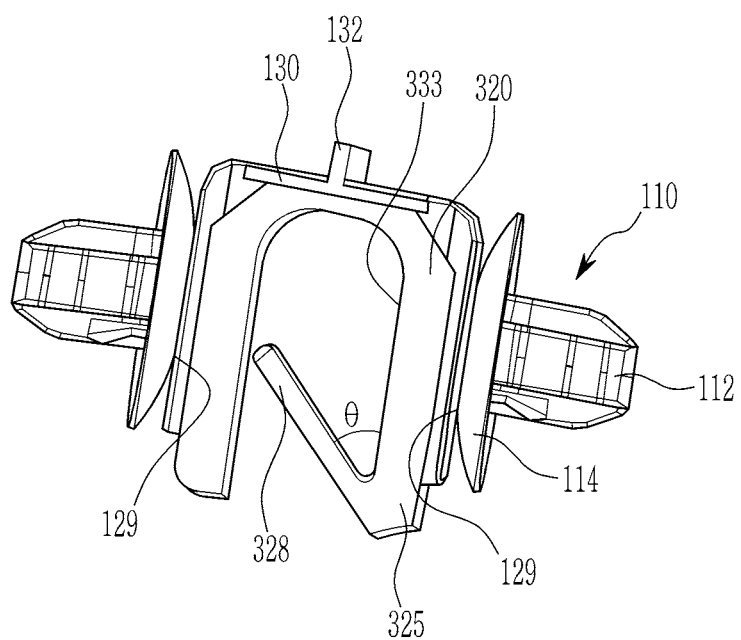
FIG. 5 is a schematic side view of a clip for vehicles according to various exemplary embodiments of the present invention.

FIG. 5 is a schematic side view of a clip for vehicles according to various exemplary embodiments of the present invention.

Referring to FIG. 5, a clip 300 for vehicles includes a pair of guide legs 325 which is an asymmetric shape facing each other, and one guide leg of the pair of guide legs 325 includes a protruding portion 328 which an object mounted between the guide legs 325 is not broken away toward a lower portion. Here, at an end portion of the other guide leg of the pair of the guide legs 325, hook protruding toward the opening 333 may be omitted. Furthermore, one opening 333 may be formed at the clip body portion 320 so that one object is mounted between two guide legs 325.

In an exemplary embodiment of the present invention, the protruding portion 328 is protrudingly formed at one of the pair of guide legs 325 toward the other guide leg of the pair of guide legs 325 with a predetermined acute angle (Θ) with respect to the other guide leg of the pair of guide legs 325.

Figure 6:
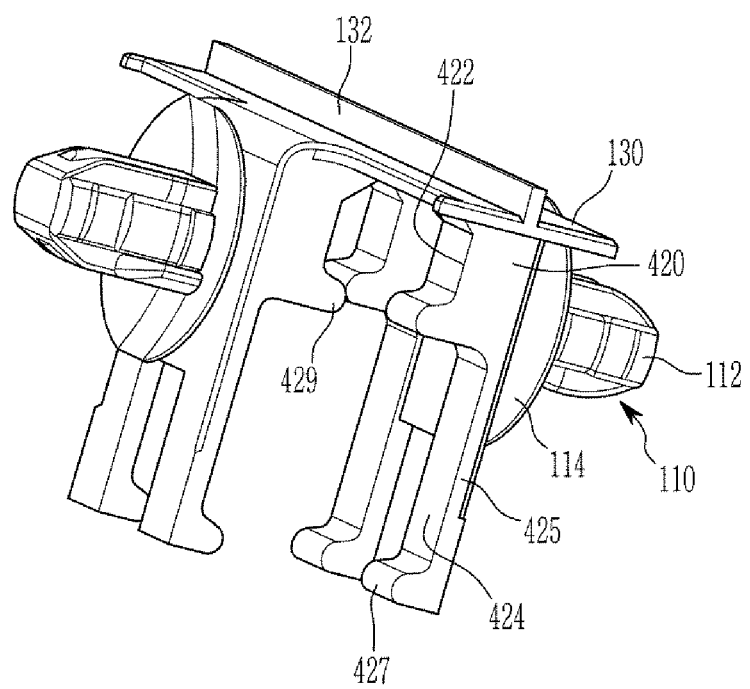
FIG. 6 is a schematic perspective view of a clip for vehicles according to various exemplary embodiments of the present invention.

FIG. 6 is a schematic perspective view of a clip for vehicles according to various exemplary embodiments of the present invention.

Referring to FIG. 6, a clip 400 for vehicles includes two pair of guide legs 425 which is a symmetric shape facing each other, and hooks 427 protruding toward an opening 424 may be formed at an end portion of the each guide leg 425. At a center portion of the guide legs 425, a mounting protrusion 429 protruded toward the opening 422 formed at the clip body portion 420 is formed such that openings 422 and 424 may formed be one by one at an upper side and lower side on a basis of the mounting protrusion 429.

In an exemplary embodiment of the present invention, the opening 422 is smaller than the opening 424.

Like this, according to an exemplary embodiment of the present invention, the clip for vehicles prevents dualization of part number due to asymmetry when a prior T clip is applied and may be shared broadly.

Furthermore, cost reduction may be expected by mass production of the corresponding clip from now on.

Furthermore, sharing is possible according to public use of the clip when the clip is used to a curtain airbag or a power cable.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

We claim:

1. A clip for vehicle, the clip comprising:
   a clip body portion including a plurality of guide legs facing each other and at least an opening between the plurality of guide legs;
   a plurality of stud portions provided at an outside of the clip body portion and configured to face each other to selectively fix the clip body portion to a panel; and
   a clip wing portion formed at a side portion of the clip body portion and configured for mounting at least an object on the clip body portion,
   wherein the plurality of stud portions are provided to be detachable from the side portion of the clip body portion.

2. The clip of claim 1, wherein each of the plurality of stud portions includes:
   a panel fixing body; and
   a stud body protrudingly formed at a portion of the panel fixing body in a radial direction of the panel fixing body.

3. The clip of claim 1,
   wherein the clip body portion includes a coupling hole, and
   wherein a portion of the panel fixing body is detachably coupled to the coupling hole of the clip body portion, so that the panel is configured to be mounted between the panel fixing body and the clip body portion.

4. The clip of claim 2, wherein the stud body is provided as an oval shape being convex toward the clip body portion.

5. The clip of claim 1, wherein the clip wing portion is provided at an upper surface of the clip body portion as a plate shape extending in a longitudinal direction of the clip body portion.

6. The clip of claim 1, wherein the clip body portion and the clip wing portion are combined with each other to be 'T' shape.

7. The clip of claim 6, wherein the clip body portion and the clip wing portion are monolithically combined with each other.

8. The clip of claim 1, wherein the plurality of guide legs is provided to extend from an upper end portion to a lower end portion of the clip body portion.

9. The clip of claim 8, wherein the plurality of guide legs is provided as a pair of facing each other symmetrically to form the at least an opening between the plurality of guide legs.

10. The clip of claim 8, wherein a first hook and a second hook protruding toward the at least an opening are provided at each end portion of the guide legs, respectively.

11. The clip of claim 8, wherein at least one mounting protrusion is provided protrudingly at a center portion of at least one of the guide legs to form a plurality of openings positioned adjacent to the at least one mounting protrusion so that the at least one object is mounted on the plurality of openings.

12. The clip of claim 11, wherein at least one of the plurality of openings is smaller than remaining openings among the plurality of openings.

13. The clip of claim 8, wherein the plurality of guide legs is provided as a pair in an asymmetric shape, and a first guide leg of the pair of guide legs includes a protruding portion protruding toward a second guide leg of the pair of guide legs.

14. The clip of claim 13, wherein the protruding portion is protrudingly formed toward the second guide leg of the pair of guide legs with a predetermined acute angle with respect to the first guide leg.

15. The clip of claim 1, wherein the clip wing portion includes a dividing member provided to extend in a longitudinal direction of the clip wing portion on an upper surface of the clip wing portion to position a first object of the at least one object on a first side and a second object of the at least one object at a second side of the dividing member.

16. The clip of claim 1, wherein the at least an object is one of electrical components including a curtain airbag, a handle bracket and a wiring cable.

* * * * *